June 6, 1933.　　　D. KUSKIN ET AL　　　1,912,777
WINDSHIELD WIPER AND MOTOR THEREFOR
Filed Aug. 22, 1930　　2 Sheets-Sheet 1
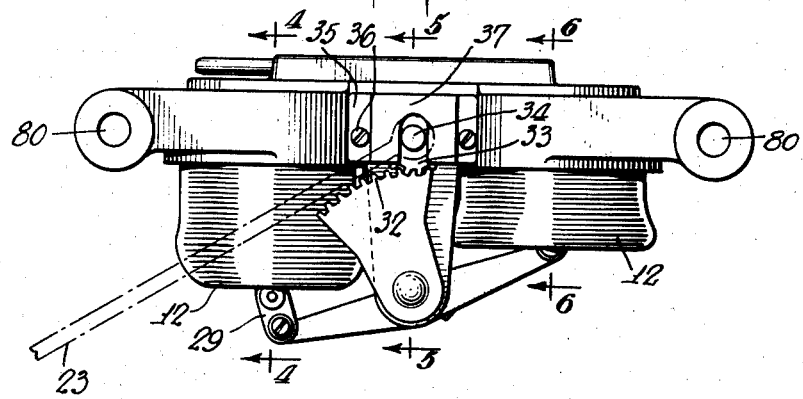
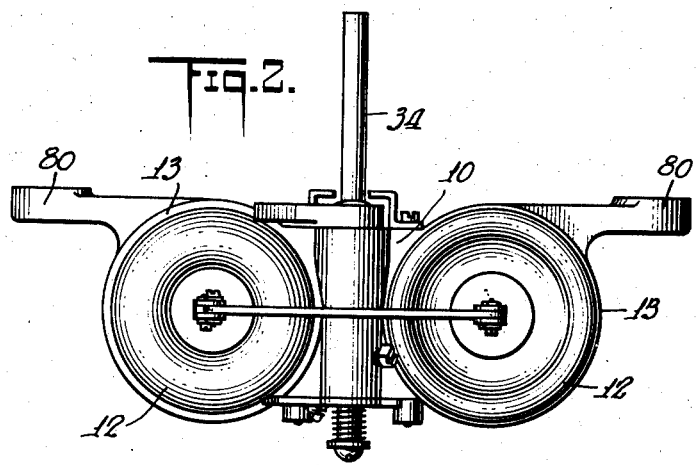
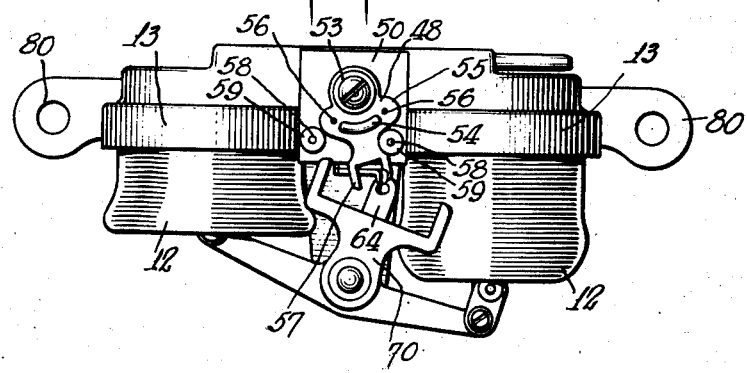
INVENTORS
David Kuskin
Duncan A. McConnell
BY
Dean, Fairbank, Hirsch Foster
ATTORNEYS June 6, 1933.   D. KUSKIN ET AL   1,912,777
WINDSHIELD WIPER AND MOTOR THEREFOR
Filed Aug. 22, 1930   2 Sheets-Sheet 2
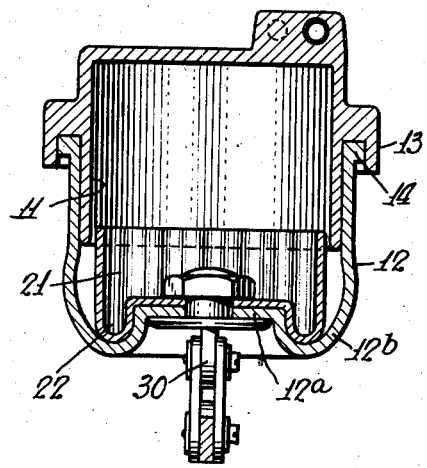
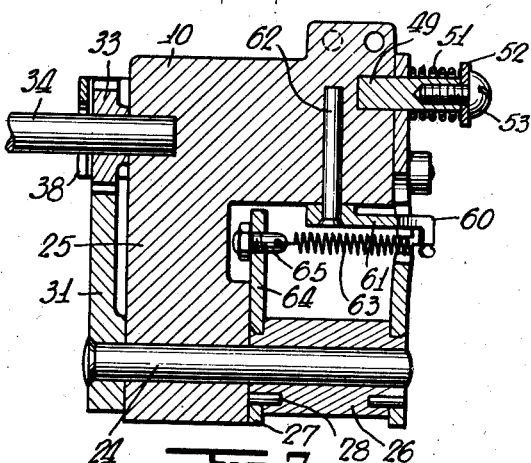
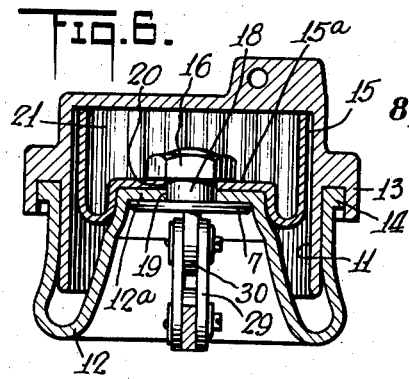
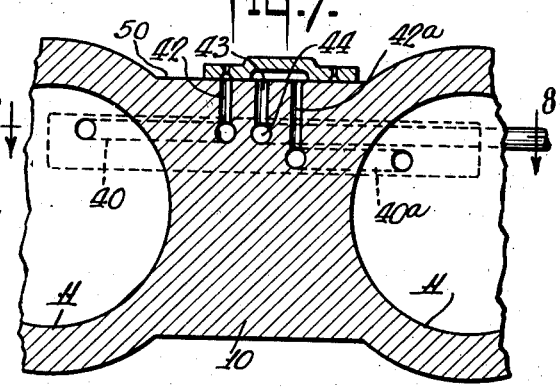
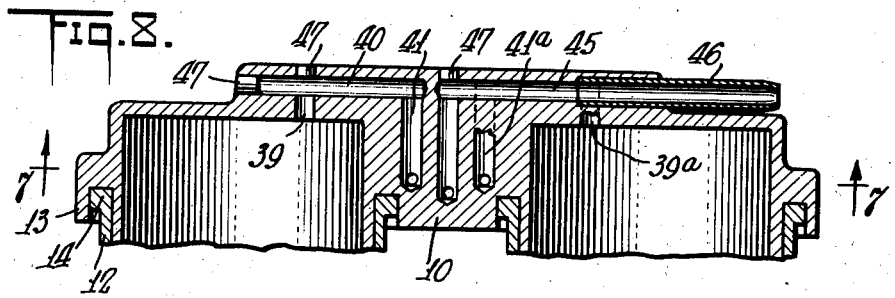
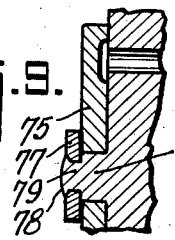
INVENTORS
David Kuskin
Duncan A. McConnell
BY
Dean, Fairbank, Hirsch & Foster
ATTORNEYS Patented June 6, 1933

1,912,777

UNITED STATES PATENT OFFICE

DAVID KUSKIN, OF BRONX, NEW YORK, AND DUNCAN A. McCONNELL, OF EAST ORANGE, NEW JERSEY, ASSIGNORS, BY DIRECT AND MESNE ASSIGNMENTS, TO FRANKLIN J. FOSTER, OF NEW YORK, N. Y.

WINDSHIELD WIPER AND MOTOR THEREFOR

Application filed August 22, 1930. Serial No. 477,032.

The present invention is concerned with a fluid pressure operated motor which may have a wide and varied range of utility, but which is peculiarly adapted and primarily intended for use in operating windshield wipers and is of the so called "suction" type operating on the differential pressure between atmospheric and the lower pressure induced in the working chamber or chambers of the motor by suction.

An object of the invention is to provide a motor of this character which is substantially frictionless in operation, more particularly a motor which is devoid of sliding or reciprocating parts apt to create friction.

Another object is to provide a suction motor in which there is no danger of leak of air into the suction chamber inasmuch as the motor is devoid of any elements movable through the walls of the low pressure working chambers.

Another object of the invention is to provide a small, compact unit capable of developing a maximum amount of power as compared with the area of the differential air pressure surfaces employed, and capable of utilizing a small pressure differential between a low pressure source and the atmosphere to apply a substantial force upon the wiper or other device to be actuated.

Another and more specific object of the invention is to provide a wiper by which the use of pistons, or equivalent actuating members are entirely eliminated, together with the friction and the possibility of leakage which is always present where such members are used.

Another object is to provide a motor in which the working chamber is of the collapsible type, and the collapse of the chamber is effected without friction, leak or noise, the expansion and contraction of the chamber being preferably accomplished by the distortion of inherently distortable chamber walls.

Another object is to provide a motor in which the deformable or distortable walls of the working chambers are utilized as the power applying elements without any tendency of the walls to crinkle while collapsing to be locally stressed, or to be repeatedly everted.

More specifically, such object is to definitely direct and control the collapse of the walls, to reinforce them during collapsing on the power stroke and to provide for an accurate, dependable and uniform action of the distortable wall members regardless of the loads imposed upon them or of the large or small pressure differentials which may be acting upon opposite sides of such walls.

Another object of the invention is to provide a small, compact motor unit adapted for convenient application adjacent the windshield of an automobile, and including wiper driving mechanism operated from the collapsible walls of the motive chamber or chambers, which mechanism is substantially devoid of sliding parts, whereby friction in the operating mechanism is minimized.

Another object is to provide a motor of the distortable walled character, in which the walls inherently tend to resist deformation on the power stroke and tend to automatically restore themselves to fully extended position on the idle stroke, this arrangement eliminating the need for using special restoring means to pull them to extended position.

Another object is to avoid the use of unduly stiff rubber and of restoring springs and in fact of any material or element calculated to impose a needless load on the motor. Thus substantially the full power of the motor is translated into useful work.

Another object is to provide a motor of the collapsible and expansible chamber type, in which the collapsing action is effected by the inherent deformability of the walls and yet in which there is no need for clamping the deformable elements to a rigid part of the chamber, and such deformable elements are automatically self-sealing during operation.

Another object of the invention is to provide a motor especially designed for actuating windshield wipers, which employs a pair of working chambers arranged in side by side generally parallel relationship, the chambers being small, whereby the use of large areas to which power is applied is avoided as is the common practice of utilizing elongated tubes of relatively large diameter, and the motor when in place will be extremely inconspicuous, to the end that the attractive appearance of the car is not detracted from by the prominence of the motor structure.

In accordance with a preferred embodiment of the invention, the motor includes a pair of working chambers arranged in side by side relationship, each chamber consisting of a rigid section and a deformable section. The latter is preferably in the nature of rubber bags open at one end and closed at the other end and having their open ends telescoped over the cup like stationary parts of the chambers. By this arrangement the chambers are rendered self-sealing, since low pressure conditions within the working chamber merely tend to cause the bags to hug more closely the stationary chamber walls which they encircle.

Preferably the two bags are connected to opposite ends of a walking beam the pivot of which is between the bags, and motion is transmitted thru suitable mechanism preferably of oscillatory type from the walking beam to the power takeoff of the motor.

For the sake of compactness the entire power transmitting and motion translating mechanism may be conveniently associated with or mounted on a small standard or projection disposed between the bags and preferably forming an integral part of a common casting which provides the stationary section of the working chambers. The necessary suction ports and passages by which the chambers are connected alternately with a suction line and atmospheric air are preferably drilled directly in the casting and a simple form of quick acting valve mechanism controlled from or synchronously with the power transmitting train and controlling the flow of motor fluid is mounted on the casting between the two working chambers.

The motor of the present application represents an improvement on the motor disclosed in the copending application of David Kuskin, Serial No. 385,828, filed August 14, 1929, which application contains generic claims to the motor and to the motor and wiper combination.

The invention and numerous advantages thereof not hereinbefore specifically pointed out may be better understood from the following description in connection with the accompanying drawings, wherein, Fig. 1 is a side elevational view of a windshield wiper motor embodying the invention.

Fig. 2 is a bottom plan view thereof.

Fig. 3 is an elevational view of the opposite side of the motor from that shown in Fig. 1.

Fig. 4 is a transverse sectional view on the line 4—4 of Fig. 1.

Fig. 5 is an enlarged sectional view on the line 5—5 of Fig. 1.

Fig. 6 is a sectional view on the line 6—6 of Fig. 1.

Fig. 7 is a fragmentary longitudinal horizontal sectional detail through the central portion of the casting taken approximately on the line 7—7 of Fig. 8.

Fig. 8 is a vertical longitudinal sectional detail through the casting showing the various ports and passageways therein, and taken approximately on the line 8—8 of Fig. 7.

Fig. 9 is an enlarged sectional detail showing a slightly modified form of valve mechanism.

The motor includes a generally flat elongated casting, 10, presenting near its opposite ends a pair of projecting spaced parallel generally circular socket forming members, 11.

Distortable bags, 12, of rubber or the like have their open ends telescoped over the mouths of the socket forming members 11 and cooperate with the sockets to afford working chambers. When the air is exhausted from these chambers the collapsible bags, 12, will move from position of Fig. 4 to position of Fig. 6. These bags tend, by their own inherent resiliency, to normally spring outwardly, as shown in Fig. 4.

To limit the telescoping of the bags over members 11 and to protect the mouths of the bags against casual abrasion, each cup like socket forming member 11 is encircled by an annular trough, 13, adapted to receive and house the beaded mouth, 14, of an associated bag.

The bag and socket structure, as thus described, obviates the need for the use of special clamping devices or special precautions to seal the working chambers. Low pressure conditions in the chambers operate automatically to cause the bags to hug the walls of the socket forming members 11 and insure an air tight seal. The beaded mouths of the bag preferably fit the trough with sufficient snugness so that there is no danger of inadvertently dislodging the bags during assembling and shipment. Furthermore suction within the chambers tends to hold the bags in fully telescoped relation with members 11 at all times and thus renders the bags completely self-sealing.

As best seen in Fig. 4, the central portion of each bag is somewhat reduced in thickness as indicated at 12-a, and is forced into the depressed outer end of a guide cup 15. Thus the thin bag centers are connected to the socket gripping bag mouth by a gradually rolled or curved annular section, 12-b, of rubber.

Figs. 4 and 6 represent respectively the condition of the bags at the start of the power stroke and at the end of the power stroke and the particular bag conformation employed is such that as the center of the bag moves inwardly, the portion 12-b of the bag rolls, or is gradually distorted. The life of the rubber is materially prolonged by avoiding any eversion on either the power or the idling strokes of the bags.

The reduced bag centers, 12-a, together with the sunken circular intermediate portions, 15-a, of guide cups, 15, are clamped between an internal nut, 16, and an external clamping disc, 17, the nut preferably screwing on to the threaded end of a stud, 18, carried by the disc, 17, and passing through suitable openings, 19 and 20, in the members 12-a and 15-a, respectively.

The external diameter of the cup, 15, is appreciably less than the internal diameter of the socket, 11, whereby the guide cup is inoperative to afford any air checking effect, or to engage the internal wall of the socket and thus create frictional resistance to oppose collapse or expansion of the bags. The danger of frictional contact between the guide cups and the socket walls may be further minimized, if desired, by corrugating the socket walls or by corrugating the guide cups as indicated at 21.

The cups 15, have generally cylindrical side walls, divided from the depressed cup bottoms 15-a, by troughs, 22, the cross sectional shape of which closely follows the cross sectional shape of the bags just beyond the flat centers of latter. By clamping the bag centers into the depressed bottoms of the cups, the bags will follow the contours of the cups.

The guide cups prevent localized distortion of the bags when the working chambers are connected with a source of suction, in that they are effective to prevent creasing and folding of the bags or pinching of the bags during the power strokes of the motor. The reason for this is that when suction is induced in the working chamber, it will instead of folding the sides of the bags in under the closed centers thereof, merely cause the sides of the bags to snugly embrace the guide cups, and, as the cups move inwardly under the influence of the bags, the bags will gradually be released or unrolled as shown in Fig. 6. Thus, the cups are operative to prevent creasing and pinching of the bags as well as to control and render uniform the progress of distortion.

From the foregoing description, it will become apparent that either one of the working chambers, consisting of the socket and the collapsible bag, together with the guide cup, is, in effect, a single-acting motor having a working chamber of the distortable wall type. The power stroke of the motor is suction induced, and the idle stroke of the motor is produced by the inherent resiliency of the distortable wall.

Thus, in its broader aspects, the invention contemplates the use of any suitable mechanism for regulating the periodic reduction and increase of pressure in a working chamber of the character described, and contemplates the use of one or more of such working chambers valved in any suitable manner, and actuating any suitable power transmitting and motion translating devices.

In the preferred embodiment of the invention herein illustrated, however, two working chambers are employed and means is provided for alternately connecting them to atmosphere and to the source of low pressure motive fluid, such, for instance, as the intake manifold of an internal combustion engine. The two working chambers are, for illustrative purposes, connected to an oscillating power transmitting train operative to translate reciprocatory distortion of the bags into a regular uniform oscillation of a shaft such, for instance, as the shaft indicated in dotted lines at 23, which is adapted to carry a squilgee or equivalent window cleaning device (not shown).

The power transmitting mechanism herein illustrated is especially designed to eliminate friction and is devoid of sliding parts. This mechanism includes a rock shaft, 24, journalled in an extension, 25, of the casting. Fixed upon one projecting end of the rock shaft, 24, is a sleeve, 26, to which the center of a walking beam, 27, is pinned as at 28. The ends of the walking beam are connected by links, 29, to extension eyes, 30, projecting from the discs, 17. Thus, as the collapsible chambers of the motor are alternately expanded and contracted, an oscillating movement is imparted to the walking beam to thereby oscillate the rock shaft, 24, and oscillate a plate, 31, fixed upon the end of the rock shaft.

The free arcuate edge of this plate is provided with a series of teeth, 32, meshing with a pinion, 33, fixed on a stub shaft, 34, projecting from the casting.

The means for limiting axial movement of the stub shaft 34 comprises a strap, 35, screwed or otherwise secured, as at 36, upon the casting, 10, and having its intermediate portion, 37, offset to receive the pinion, 33, and slotted at 38 to receive the shaft, 34. Thus axial movement of shaft, 34, is limited to the slight play afforded the pinion, 33, between the casting wall and the center, 37, of the strip.

The casting itself is drilled to provide the necessary ports and passageways for the admission and exhaust of air to and from the working chambers. The bottoms of the chambers communicate thru ports, 39, and 39a, respectively, with passageways, 40, and 40a, respectively, extending longitudinally of the casting and communicating with passageways 41, and 41a, respectively, which in turn communicate with ports 42 and 42a, terminating at the outer flat face, 50, of the intermediate portion of the casting.

Thus, were it not for the provision of suitable valve mechanism each working chamber would communicate freely with the atmosphere thru the series of ports passages, 39, 40, 41, and 42, or 39a, 40a, 41a, and 42a, as the case may be.

Between the exposed ends of the passageways 42a, a suction line port 43, is drilled into the face of the casing, this port communicating thru a passageway, 44, with a longitudinally extending suction passageway, 45, receiving within its mouth a tube, 46, adapted to be connected with any suitable source of suction, such for instance, as the intake manifold of an internal combustion engine.

The various passageways in the casting are drilled in conventional manner and their dead ends are closed where necessary by plugs, 47. A flat valve plate, 48, is pivoted upon a stud, 49, for oscillatory movement over the flat ported surface, 50, of the casting. If desired, the valve plate may be spring urged into tight engagement with the surface, 50, by a coiled expansion spring, 51, encircling the stud, 49, and reacting against a washer, 52, held in place by a screw, 53, screwed into the end of the stud.

The valve plate, 48, is depressed to provide an arcuate hood portion, 54, adapted to establish communication between the port, 43, and either of the ports 42, 42a. Laterally beyond the hood portion, 54, the plate is provided with ears, 55, having pin hole apertures, 56, therein. The free end of the plate, 48, is forked or bifurcated as at 57, and oscillating movement of the plate is limited by stop pins, 58, fixed in the casting at opposite sides of the plate and preferably encircled by silencing and shock absorbing rubber rollers, 59.

The angularly turned free end, 60, of a pivoted arm, 61, lies within the fork, 57, arm 61 being preferably fixed to a pivot pin, 62, journalled in the casting, 10. The free end, 60, of the arm, 61, is connected by a coiled contractile spring, 63, with the end of an arm, 64, integral with the walking beam, 27, the connection of spring to arm, 64, being preferably effected thru the intermediacy of a tension adjusting screw, 65.

The foregoing construction provides a quick acting valve mechanism controlled by the past center spring, 63. The operation of this valve mechanism is substantially as follows:

With the parts in the position of Fig. 3, the valve plate, 48, has just been snapped to the right so that the hood, 54, has placed right hand working chamber in communication with the source of suction and the left hand pin hole, 56, is permitting air to bleed into the left hand working chamber. As the right hand chamber is contracted, it will be apparent that the walking beam will be rocked and the arm, 64, will start to swing to the left. Just as the working stroke of the right hand chamber is being completed, the spring, 61, will be moved past the center defined by pivot, 62, and the arm, 61, will be swung smartly to the left as the tensioned spring contracts, thereby acting thru the fork, 57, to kick the valve to the left. As the valve assumes this new position, the left hand chamber is again placed in communication with suction and the right hand chamber communicates with the air through the small port, 56. As the next working stroke is completed a reverse operation of the valve and its actuating mechanism takes place.

The yoke member, 70 (Fig. 3), which is fixed to the end of the sleeve, 26, serves merely as an emergency device to engage the valve plate and shift it in the event that the valve should stick.

It will be observed that all forces acting on the valve plate tend to hold it tightly against the casting, regardless of whether or not the spring, 51, is used, that is to say, that portion of the valve plate which defines the hood, 54, is urged against the casting by suction and air bleeding inwardly thru one or the other of the pin hole ports, 56, also urges the valve against the casting.

Fig. 9 suggests a simplified form of valve plate which might be utilized. This valve plate, 75, is pivoted on a stud, 76, integral with the casting and retained in place by a washer, 77, secured by upsetting or riveting over at 78, the reduced end, 79, of the stud. Even with a few thousandths of an inch clearance to assure free pivoting of the valve plate, there will be no tendency for the valve to leak, since, as pointed out above, all forces act to seal it and urge it against the casting. The size of the openings, 56, which control the admission of air to the working chambers is an important factor in regulating the speed of motor. By forming these minute passageways or orifices in the stamped valve plate we avoid the need for expansive or delicate machining operations on the casting, such, for instance, as the use of exceedingly fine drills to form the passageways. We are furthermore enabled to get a large suction opening for the working stroke and a small inlet opening for the idle stroke.

In operation as the collapsible chambers are alternately expanded and contracted, their reciprocatory movement is translated into a regular oscillatory movement of the shaft, 34, and the arm, 23, consequently swung thru any desired range of movement, it being apparent that the range of movement of this arm is solely dependent upon the gear ratio between rack, 32, and pinion, 33.

If desired, a dust-proof cover, not shown, may be used to enclose or substantially enclose the motor. The casting is preferably provided with apertured ears, 80, to be attached to a windshield frame and the stud shaft, 34, is preferably of sufficient length so that it may project thru the windshield frame and carry a wiper at its outer end permitting the motor itself to be housed within the car.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What we claim is:

1. A suction motor for operating windshield wipers or the like including a working chamber comprising a stationary chamber forming member having an open end and a distortable bag telescoped thereover and closing the same, means for alternately exhausting air from and admitting air to the chamber and means connected to the closed end of the bag for taking off power from the motor, said bag when collapsed inwardly as air is exhausted from the chamber acting to hug the outside of said chamber forming member and prevent leakage of air under the bag into the chamber.

2. A suction motor for operating windshield wipers or the like including a working chamber comprising a stationary externally cylindrical hollow member and a distortable member having an open end telescoped over the cylindrical member and closing the latter, means for alternately exhausting air from and admitting air to the chamber, means connected to the distortable member for taking off power from the motor and means within the working chamber carried by the distortable member and guided by the walls of the stationary member for guiding and controlling the suction impelled movement of the distortable member.

3. A suction motor for operating windshield wipers or the like including a working chamber comprising a hollow cylindrical stationary member having an open end and a distortable bag telescoped over the cylinder and serving as the movable end wall thereof, means for alternately exhausting air from and admitting air to the chamber, means connected to the bag for taking off power from the motor and means for guiding and controlling the suction impelled movement of the bag comprising a guide member secured to the center of the bag at the interior thereof guided by the cylindrical member and following in general contour the cross section of the movable end of the bag.

4. A suction motor for windshield wipers or the like including a casting including parts adapted to facilitate its attachment adjacent the windshield of a car, said casting presenting a pair of spaced, parallel externally cylindrical hollow projections, collapsible rubber bags of greater length than the projections telescoped over and closing the mouths of said projections and cooperating therewith to define distortable walled working chambers, means including a quick acting valve mechanism for alternately placing said chambers respectively in communication with atmosphere or a source of sub-atmospheric pressure and means connected to the bags for taking off power from the motor.

5. A differential pressure motor for windshield wipers or the like including a casting adapted for attachment adjacent the windshield of a car, said casting presenting a pair of spaced, parallel, hollow projections, collapsible rubber bags of greater length than said projections telescoped over and closing the open ends of said projections and cooperating therewith to define distortable walled working chambers, means including a quick acting valve mechanism for alternately placing said chambers respectively in communication with atmosphere or a source of sub-atmospheric pressure, means for taking off power from the motor actuated from the distortable walls of the working chambers, said bags due to their excess length being foldable inwardly by a substantially free rolling flexure when the chamber is in communication with a source of sub-atmospheric pressure.

6. A fluid operated motor for windshield wipers or the like including a casting adapted for attachment adjacent the windshield of a car, said casting presenting a pair of spaced, hollow projections, self-sealing collapsible rubber bags telescoped over and closing the open ends of said projections and cooperating therewith to define distortable walled working chambers, means including a quick acting valve mechanism for alternately placing said chambers respectively in communication with atmosphere or a source of motive fluid, a walking beam pivoted intermediate its ends between the chambers, means connecting the ends of the walking beam with the movable chamber walls and a power take-off shaft actuated from the beam.

7. A suction motor of the class described including a body portion presenting a pair of spaced sockets, distortable members sealing the mouths of such sockets and cooperating with the sockets to define working chambers, means for alternately exhausting air from and admitting air to said chambers, a power-transmitting, motion-translating mechanism connected to and actuated by the movable walls of the chambers, and means disposed within the chambers and connected to the movable walls thereof for guiding and controlling the suction impelled power-stroke of said walls, said means comprising cup-shaped members, the skirt portions of which are guided by the sockets and the ends of which are directly connected to the centers of the distortable members.

8. In a suction motor, a working chamber including a hollow stationary chamber forming portion and a collapsible bag closing the end thereof, said chamber having a port therein through which air is adapted to be alternately exhausted and admitted, a guide cup arranged within the chamber and connected to the center of the bag and including a skirt portion of cross section following the cross section of the chamber and guided by the walls thereof but affording adequate clearance between itself and the stationary chamber wall for free passage of air around the cup.

9. In a suction motor, a working chamber including a hollow stationary chamber forming portion and a collapsible bag telescoped over and closing the end thereof, said chamber having a port therein through which air is adapted to be alternately exhausted and admitted, a guide cup arranged within the chamber guided by the walls thereof and connected to the center of the bag and affording adequate clearance between itself and the stationary chamber wall for free passage of air around the cup, the end of the cup being centrally depressed to provide a circular depression in which the center of the cup is clamped.

10. In a suction motor a working chamber including a hollow stationary chamber forming portion and a collapsible bag telescoped over the end thereof, said chamber having a port therein through which air is adapted to be alternately exhausted and admitted, a guide cup arranged within the chamber and connected to the center of the bag and including a skirt portion affording adequate clearance between itself and the stationary chamber wall for free passage of air around the cup, but guided by said wall, the end of the cup being centrally recessed to provide a circular depression in which the center of the cup is clamped, and a rounded shoulder about said depression following the contour of the bag, the center of the cup being clamped within the depression.

11. In a suction motor a working chamber including a hollow stationary chamber forming portion and a self-sealing collapsible bag telescoped over and closing the end thereof, said chamber having a port therein through which air is adapted to be alternately exhausted and admitted, the exterior of said stationary member having a trough therearound to receive the mouth of said bag and afford an abutment therefor.

12. A light duty suction motor of the class described including a casting presenting a pair of spaced parallel circular collars and an upstanding boss between said collars, a pair of self-sealing rubber bags telescoped over and closing said collars and cooperating therewith to define working chambers of the movable walled type, a walking beam pivoted between its ends on the boss, means connecting the ends of the beam to the cups, a rock shaft journalled in the boss and motion translating mechanism connecting the beam and the rock shaft.

13. A light duty suction motor for windshield wipers or the like including a casting presenting a pair of spaced parallel externally cylindrical working chambers, each of said chambers having an open end, a pair of distortable bags telescoped over the open ends of the chambers to close them and afford distortable end walls therefor, means for alternately exhausting air from one chamber and admitting air to the other chamber, the skirt portions of the bags being self-sealing to prevent entry of air thereunder as the bag ends are sucked in by exhausting the air from said chambers and means attached to the closed bag ends for taking off power from the motor.

14. A light duty suction motor for windshield wipers or the like including a casting presenting a pair of spaced parallel externally cylindrical working chambers, each of said chambers having an open end, a pair of distortable bags telescoped over the open ends of the chambers to close them and afford distortable end walls therefor, means for alternately exhausting air from one chamber and admitting air to the other chamber, the skirt portions of the bags being self-sealing to prevent entry of air thereunder as the bag ends are sucked in by exhausting the air from said chambers and means attached to the closed bag ends for taking off power from the motor, said means including a walking beam pivoted at its center between the chambers and means operatively connecting the ends of the beam to the centers of said bags.

15. A light duty suction motor for windshield wipers or the like including a casting presenting a pair of spaced parallel externally cylindrical working chambers, each of said chambers having an open end, a pair of distortable bags telescoped over the open ends of the chambers to close them and afford distortable end walls therefor, means for alternately exhausting air from one chamber and admitting air to the other chamber, the skirt portions of the bags being self-sealing to prevent entry of air thereunder as the bag ends are sucked in by exhausting the air from said chambers and means attached to the closed bag ends for taking off power from the motor, said bags being of resilient material and tending to automatically restore themselves to normal shape when pressure upon opposite sides thereof is equalized by admission of air to the interior of the chambers.

16. A light duty suction motor including a casting presenting an upstanding cylinder open at one end and having a passage communicating with its other end through which air may be exhausted or admitted, a rubber bag including a skirt portion telescoped over said cylinder and a centrally depressed end portion serving as a movable wall for the end of the cylinder, the skirt portion of said bag being of greater length than the cylinder over which it is telescoped whereby to afford free rolling flexure at the end of the bag, means for alternately exhausting air from and admitting air to the cylinder and means connected to the center of the bag for taking off power, sub-atmospheric pressure within the chamber acting automatically to cause the skirt of the bag to hug the outside of the cylinder as the bag is drawn inwardly and thereby prevent entry of air to the cylinder under the bag.

17. A light duty suction motor including a casting presenting an upstanding cylinder open at one end and having a passage communicating with its other end through which air may be exhausted or admitted, a distortable bag including a skirt portion telescoped over said cylinder and a centrally depressed end portion serving as a movable wall for the end of the cylinder, the skirt portion of said bag being of greater length than the cylinder over which it is telescoped whereby to afford free rolling flexure at the end of the bag, means for alternately exhausting air from and admitting air to the cylinder, means connected to the center of the bag for taking off power, and means for guiding and controlling the collapsing movement of the bag including a guide member within the cylinder having a portion attached to the center of the bag and a portion guided by the inner wall of the cylinder.

Signed at New York, in the county of New York and State of New York, this 19th day of August, 1930.

DAVID KUSKIN.
DUNCAN A. McCONNELL.